(12) United States Patent
Hagiwara et al.

(10) Patent No.: US 8,536,465 B2
(45) Date of Patent: Sep. 17, 2013

(54) ELECTROCHEMICAL DEVICE

(75) Inventors: Naoto Hagiwara, Takasaki (JP); Katsuei Ishida, Takasaki (JP); Kazushi Yawata, Takasaki (JP); Motoki Kobayashi, Takasaki (JP)

(73) Assignee: Taiyo Yuden Co., Ltd, Tokyo (JP)

( * ) Notice: Subject to any disclaimer, the term of this patent is extended or adjusted under 35 U.S.C. 154(b) by 276 days.

(21) Appl. No.: 12/933,263

(22) PCT Filed: Mar. 16, 2009

(86) PCT No.: PCT/JP2009/055566
§ 371 (c)(1),
(2), (4) Date: Nov. 23, 2010

(87) PCT Pub. No.: WO2009/119465
PCT Pub. Date: Oct. 1, 2009

(65) Prior Publication Data
US 2011/0056737 A1 Mar. 10, 2011

(30) Foreign Application Priority Data
Mar. 18, 2008 (JP) .................................. 2008-069316

(51) Int. Cl.
*H01R 13/46* (2006.01)
(52) U.S. Cl.
USPC ........ 174/520; 174/527; 174/549; 361/301.1; 361/301.3
(58) Field of Classification Search
USPC ............... 174/50.5, 50.51, 301.1, 301.3, 502, 174/520, 524, 517, 518, 523, 541, 260, 527, 174/528, 549, 551, 553, 554, 564; 361/301.1, 361/301.3
See application file for complete search history.

(56) References Cited

U.S. PATENT DOCUMENTS

| 4,001,655 A * | 1/1977 | Voyles et al. .................. 361/534 |
| 4,757,424 A * | 7/1988 | Morimoto et al. ............. 361/502 |
| 5,398,155 A * | 3/1995 | Sato et al. ...................... 361/502 |
| 6,844,105 B1 | 1/2005 | Hanafusa et al. |
| 2002/0131232 A1 * | 9/2002 | Sakata et al. ................... 361/502 |

(Continued)

FOREIGN PATENT DOCUMENTS

| JP | 2000-306556 A | 11/2000 |
| JP | 2001-338850 A | 12/2001 |

(Continued)

OTHER PUBLICATIONS

Notification of First Office Action issued by Chinese Patent Office, mailed Feb. 2, 2012, for Chinese counterpart application No. 200980118060.0.

(Continued)

*Primary Examiner* — Hoa C Nguyen
(74) *Attorney, Agent, or Firm* — Law Office of Katsuhiro Arai

(57) ABSTRACT

Provided is an electrochemical device compatible with high-temperature reflow soldering using a lead-free solder. An electrical double layer capacitor 10-1 includes a package 14 that is constructed with a film or films and has sealed parts 14a1 to 14a3 formed by sealing parts, in which films are superimposed on each other, by, for example, heat sealing. The entireties of the sealed parts 14a1 to 14a3 of the package 14 are covered in a close-contact state with a support 16 that has higher rigidity than the film(s) constructing the package 14.

6 Claims, 10 Drawing Sheets

(56) References Cited

U.S. PATENT DOCUMENTS

| | | | |
|---|---|---|---|
| 2003/0111247 A1* | 6/2003 | Araki et al. | 174/52.1 |
| 2003/0165735 A1* | 9/2003 | Nobuta et al. | 429/153 |
| 2004/0066604 A1* | 4/2004 | Sakata et al. | 361/302 |
| 2005/0168918 A1 | 8/2005 | Araki et al. | |

FOREIGN PATENT DOCUMENTS

| | | | |
|---|---|---|---|
| JP | 2003-007262 A | 1/2003 | |
| JP | 2003-272974 A | 9/2003 | |
| JP | 2004-363377 A | 12/2004 | |
| JP | 2004363377 A | 12/2004 | |
| JP | 2004363377 A5 | 3/2006 | |
| JP | 2006-164922 A | 6/2006 | |
| JP | 2006-210201 A | 8/2006 | |
| JP | 2007-095654 A | 4/2007 | |
| JP | 2007-128792 A | 5/2007 | |
| JP | 2007-323907 A | 12/2007 | |
| JP | 2008-034556 A | 2/2008 | |
| WO | 01/045184 A1 | 6/2001 | |

OTHER PUBLICATIONS

Notice of Reasons for Refusal issued by Korean Patent Office, mailed Jan. 3, 2012, in the Korean counterpart application.

"The extended European search report" dated Sep. 26, 2011, for Application No. 09726236.4.

Notice of Reasons for Refusal issued by Japanese Patent Office, mailed Sep. 12, 2012, in the Japanese counterpart application No. 2010-505606.

Notification of Reasons for Refusal issued by the Japanese Patent Office, mailed May 23, 2013, for Japanese counterpart application No. 2010-505606.

* cited by examiner

ELECTROCHEMICAL DEVICE

This application is the U.S. National Phase under 35 U.S.C. §371 of International Application PCT/JP2009/055566, filed Mar. 16, 2009, which claims priority to Japanese Patent Application No. 2008-69316, filed Mar. 18, 2008. The International Application was published under PCT Article 21(2) in a language other than English.

TECHNICAL FIELD

The present invention relates to an electrochemical device provided with a package in which an electric storage element is enclosed.

BACKGROUND ART

Electrochemical devices, for example, an electrical double layer capacitor, a lithium ion capacitor, a redox capacitor, and a lithium ion battery include those provided with a package having a sealed part formed by sealing portions of the film(s) superimposed on each other.

For example, the foregoing electrical double layer capacitor has a structure in which an electric storage element formed by sequentially stacking a positive electrode and a negative electrode with a separator between them, one end part of a positive-electrode terminal electrically coupled to the positive electrode of the electric storage element, one end part of a negative-electrode terminal electrically coupled to the negative electrode of the electric storage element, and an electrolyte are enclosed in a package made of a film or films, and the other end part of the positive-electrode terminal and the other end part of the negative-electrode terminal are led out of the package. For the package, a laminated film having, for example, a plastic protective layer, a metallic barrier layer, and a plastic sealing layer in that order is employed. The package is formed by folding one rectangular film of, for example, a predetermined size in the center thereof, and sealing three side parts of the film(s) superimposed on each other.

Along with a recent trend to compactness of electrochemical devices including the foregoing electrical double layer capacitor, demand is increasing for an electrochemical device that can be, similarly to a general electronic component, mounted on a substrate or the like by high-temperature reflow soldering using a lead-free solder, or in other words, demand for an electrochemical device compatible with high-temperature reflow soldering using a lead-free solder is increasing.

However, because the aforesaid electrochemical device is not compatible with high-temperature reflow soldering using a lead-free solder, demand for an electrochemical device that can be, similarly to a general electronic component, mounted on a substrate or the like by high-temperature reflow soldering using a lead-free solder cannot be met.

Because the furnace temperature of a reflow furnace to be adapted for reflow soldering using a lead-free solder reaches, for example, around 250° C. at most, if the aforesaid electrochemical device is placed in a reflow furnace to be subjected to reflow soldering, the sealed part of the package is deformed with heat at the time of reflow soldering, and sealing strength is reduced. A disadvantage occurs in that, due to heat, the electrolyte undergoes a vapor pressure rise and leaks out of the sealed part.

Patent document 1: Japanese Patent Laid-open No.-2006-210201

DISCLOSURE OF THE INVENTION

Problem that the Invention is to Solve

The present invention is produced in consideration of the foregoing circumstances. An object of the present invention is to provide an electrochemical device compatible with high-temperature reflow soldering using a lead-free solder.

Means for Solving the Problem

In order to accomplish the above object, the present invention is an electrochemical device that is adapted to be mounted by soldering, and is provided with a package which is constructed with a film or films and has a sealed part formed by sealing portions of the film(s) superimposed on each other, an electric storage element enclosed in the package, and a support that has higher rigidity than the film(s) and which covers at least the sealed part of the package.

According to the electrochemical device, because at least the sealed part of the package is covered with the support having higher rigidity than the film(s) does, deformation of the sealed part due to heat at the time of reflow soldering and consequent reduction in sealing strength can be suppressed by the support. In addition, the disadvantage of an electrolyte undergoing a vapor pressure rise due to heat, and leaking out of the sealed part, can be reliably avoided.

Accordingly, an electrochemical device compatible with high-temperature reflow soldering using a lead-free solder can be provided, and demand for an electrochemical device that can be, similarly to a general electronic component, mounted on a substrate or the like by high-temperature reflow soldering using a lead-free solder can be reliably met.

Advantage of the Invention

According to the present invention, there is provided an electrochemical device compatible with high-temperature reflow soldering using a lead-free solder.

The foregoing object and the other objects of the present invention, a constituent feature thereof, and an operation and advantage thereof will be apparent with a description to be made below and appended drawings.

Figure 1:
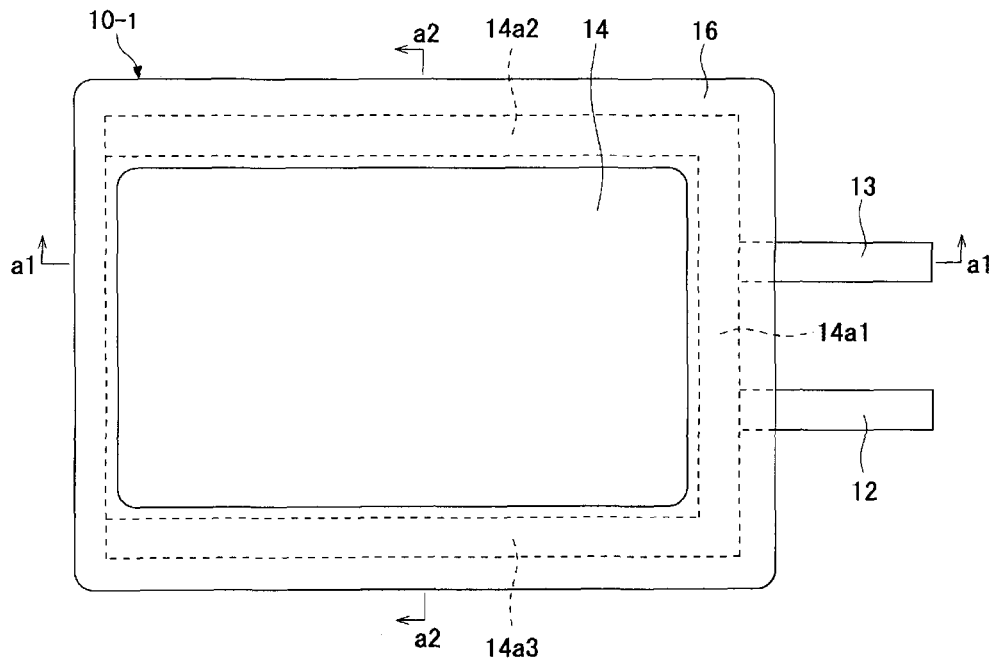
FIG. 1 is a top view of an electrical double layer capacitor showing a first embodiment in which the present invention is applied to an electrical double layer capacitor.

DESCRIPTION OF REFERENCE NUMERALS 10-1, 10-2, 10-3, 10-4, 10-5, 10-6, 10-7: electrical double layer capacitor
11: electric storage element
12: positive-electrode terminal
13: negative-electrode terminal
14: package
14$a$1 to 14$a$3, 14$b$, 14$c$: sealed part
15: electrolyte
16, 16-1, 16-2: support
17, 17-1, 17-2: support
18: package
18$a$1 to 18$a$3: sealed part
19: support
20: support
21: package
21$a$1 to 21$a$3: sealed part
22: support
23: package
23$a$1 to 23$a$4: sealed part
24: support
25: support

BEST MODE FOR CARRYING OUT THE INVENTION

First Embodiment

Figure 2:
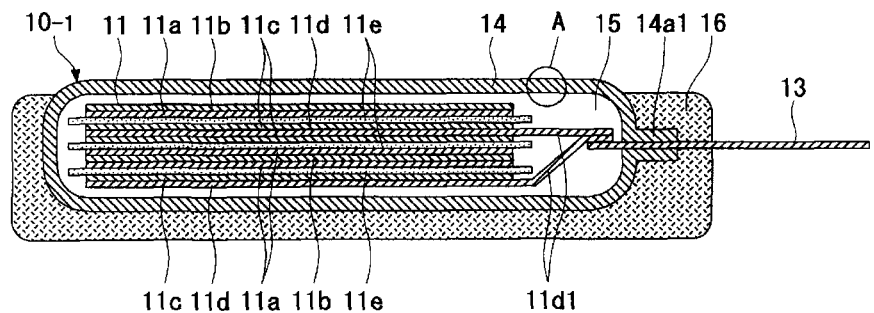
FIG. 2 is a longitudinal sectional view along an a1-a1 line in FIG. 1.
Figure 3:
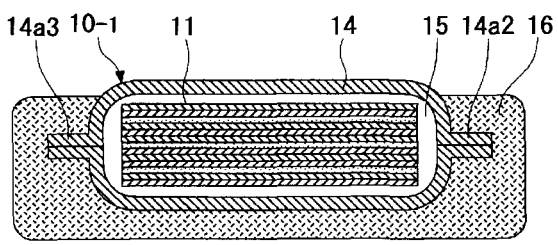
FIG. 3 is a longitudinal sectional view along an a2-a2 line in FIG. 1.
Figure 4:
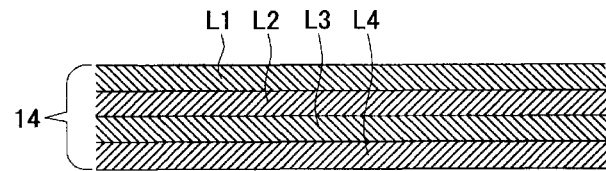
FIG. 4 is a detail view of a part A of FIG. 2.

FIG. 1 to FIG. 4 show a first embodiment in which the present invention is applied to an electrical double layer capacitor. FIG. 1 is a top view of the electrical double layer capacitor, FIG. 2 is a longitudinal sectional view along an a1-a1 line in FIG. 1, FIG. 3 is a longitudinal sectional view along an a2-a2 line in FIG. 1, and FIG. 4 is a detail view of a part A of FIG. 2.

An electrical double layer capacitor 10-1 of the first embodiment includes an electric storage element 11, a pair of terminals (a positive-electrode terminal 12 and a negative-electrode terminal 13), a package 14, an electrolyte 15, and a support 16.

The electric storage element 11 is formed by alternately stacking a positive electrode (no reference number) and a negative electrode (no reference number) with a separator 11$e$ between them. The positive electrode includes a polarized electrode for positive electrode 11$a$ and a positive current collector 11$b$ superimposed on the polarized electrode for positive electrode 11$a$. The negative electrode (no reference number) includes a polarized electrode for negative electrode 11$c$ and a negative current collector 11$d$ superimposed on the polarized electrode for negative electrode 11$c$. A joint piece 11$b$1 (not shown) is attached to an end of each positive current collector 11$b$. Likewise, a joint piece 11$d$1 is attached to an end of each negative current collector 11$d$.

For convenience' sake, FIG. 2 substantially shows three units each of which is composed of the positive electrode, negative electrode, and separator 11$e$, and which are superimposed on one another. The number of superimposed units may be 4 or more, or 1. In addition, although the electric storage element 11 having the collectors 11$b$ and 11$d$ disposed on the uppermost and lowermost layers respectively thereof is shown, a polarizable electrode or a separator may be added to the external sides of the uppermost and lowermost layers respectively in relation to a fabrication process or the like.

The positive-electrode terminal 12 and negative-electrode terminal 13 are strip-shaped using a metal such as aluminum. The positive-electrode terminal 12 has one end part thereof electrically coupled to the joint pieces 11$b$1 of the electric storage element 11. The negative terminal 13 has one end part thereof electrically coupled to the joint pieces 11$d$1 of the electric storage element 11.

The package 14 is formed using a film or films to be described later so that the contour thereof becomes rectangular, and has belt-like sealed parts 14$a$1 to 14$a$3 continuously on three sides thereof (a right side, an upper side, and a lower side in FIG. 1). As seen from FIG. 2, the electric storage element 11, one end part of the positive-electrode terminal 12, one end part of the negative-electrode terminal 13, and the electrolyte 15 are enclosed in the package 14, while the other end part of the positive-electrode terminal 12 and the other end part of the negative-electrode terminal 13 are led out of the sealed part 14$a$1 of the package 14. As for enclosure of the electrolyte 15, aside from a method of impregnating in advance the electric storage element 11 with the electrolyte 15 before forming the package, a method of, after forming the package 14, pouring the electrolyte 15 into the inside of the package 14 through a hole formed in advance and then blocking the hole, or any other method can be adopted.

As a film or films to be used to form the package 14, for example, a laminated film (see FIG. 4) (E1) having a protective layer L1 made of, for example, a plastic such as nylon, a barrier layer L2 made of a metal such as aluminum or a metal oxide such as $Al_2O_3$, an insulating layer L3 made of a plastic such as polyethylene terephthalate, and a sealing layer L4 made of a plastic such as polypropylene in that order, a laminated film (E2) having the sealing layer L4 in the laminated film E1 disposed only on the perimeter thereof, or any other film can be preferably employed. Needless to say, a laminated film (E3) having the insulating layer L3 removed from the laminated film E1 and having the sealing layer L4 made sufficiently thick, a single layer film (E4) of only the sealing layer L4 that has a sufficient thickness, or any other film may be adopted.

Incidentally, the barrier layer L2 in the laminated film E1 or E2 fills the role of preventing leakage of the electrolyte 15 from the package 14 or invasion of moisture to the package 14. The insulating layer L3 fills the role of preventing the barrier layer L2 from coming into contact with the electric storage element 11 even in a case the sealing layer L4 fuses because of, for example, a heat sealing or the like.

As a method of forming the package 14 using any of the laminated films E1 to E3 or the single layer film E4, a method of after preparing one rectangular film (E11) of a predetermined size and disposing the electric storage element 11 or the like on the sealing layer side of the rectangular film, folding the rectangular film in the center thereof, and then sealing three side parts, in which the sealing layers are superimposed on each other, by heat sealing or the like, or any other method can be preferably adopted. For the sealing, heat sealing, sealing by mechanical compression, sealing causing hardening by electron-beam irradiation, and other various methods can be employed. As energy for sealing, light, electromagnetic waves, heat, mechanical compression, or the like is cited. As a mechanism of sealing, hardening tendency, plasticity, or adherence is cited.

The support 16 is formed using a material to be described later so that it continuously covers the sealed parts 14a1 to 14a3 of the package 14, one side thereof on which no sealed part is present, and one main surface (lower surface) thereof. The support 16 has higher rigidity than the film(s) constructing the package 14. As seen from FIG. 1 to FIG. 3, the upper surface of the support 16 is rectangular-frame shaped, and a part of the upper surface of the package 14 except four sides thereof is exposed. As seen from FIG. 2 and FIG. 3, the entireties of the sealed parts 14a1 to 14a3 of the package 14 are covered in a close-contact state with the support 16. Further, as seen from FIG. 2, the proximal parts of the positive-electrode terminal 12 and negative-electrode terminal 13 led out of the sealed part 14a1 of the package 14 are covered in the close-contact state with the support 16, while the distal parts of the positive-electrode terminal 12 and negative-electrode terminal 13 jut out from the support 16.

As a material to be used to form the support 16, for example, a ceramic (E21) such as alumina, a metal (E22) having the surface thereof insulation-processed, or especially, a metal such as an alloy or cold-rolled aluminum, a plastic (E23) such as an epoxy resin, an aramid resin, or a polyimide resin, or any other material can be preferably employed. Needless to say, any other material can be employed as long as it has the aforesaid rigidity. As a measurement method for rigidity, for example, JIS K7106 is cited.

As a method of forming the support 16 using any of the materials E21 to E23, for example, a method (E31) of after employing a mould (not shown) that has a cavity shaped in line with the support 16, and inserting the package 14 into the cavity so that the distal parts of the parts of the positive-electrode terminal 12 and negative-electrode terminal 13 which are led out jut out, placing a flowable material into the cavity, hardening the material, and extracting the hardened material from the mould, a method (E32) of forming in advance blocks similar to two portions into which the support 16 is bisected up and down with the sealed parts 14a1 to 14a3 as a border, sandwiching the package 14 between the two blocks, and joining the blocks, or any other method can be preferably adopted.

Now, a description will be made of an example of a method of mounting the electrical double layer capacitor 10-1 on a circuit board by high-temperature reflow soldering using a lead-free solder.

For mounting the electrical double layer capacitor 10-1 on a circuit board (not shown), the distal parts of the positive-electrode terminal 12 and negative-electrode terminal 13 that jut out from the support 16 are disposed on associated lands (not shown) on the circuit board via a solder paste, and the support 16 is disposed on the circuit board.

If the lower-surface height of the distal parts of the positive-electrode terminal 12 and negative-electrode terminal 13 is inconsistent with the upper-surface height of the lands with the support 16 disposed on the circuit board, height adjustment is performed by appropriately folding the distal parts of the positive-electrode terminal 12 and negative-electrode terminal 13 prior to disposition.

The circuit board on which the electrical double layer capacitor 10-1 is disposed is placed in a reflow furnace. Parts to be soldered (the distal parts of the positive-electrode terminal 12 and negative-electrode terminal 13) are heated at a predetermined temperature (for example, around 250° C.) while being exposed directly to the furnace atmosphere of the reflow furnace in the course of passing through the reflow furnace. Thus, the distal parts of the positive-electrode terminal 12 and negative-electrode terminal 13 are coupled to the lands via the solder.

Because the entireties of the sealed parts 14a1 to 14a3 of the package 14 are covered in a close-contact state with the support 16 that has higher rigidity than the film(s) constructing the package 14, deformation of the sealed parts 14a1 to 14a3 due to heat at the time of reflow soldering and reduction in sealing strength due thereto can be suppressed by the support 16. In addition, a disadvantage such as the one wherein the electrolyte 15 which has undergone a vapor pressure rise due to heat leaks out of the sealed parts 14a1 to 14a3 can be reliably avoided.

Therefore, an electrical double layer capacitor 10-1 compatible with high-temperature reflow soldering using a lead-free solder can be provided. Demand for an electrical double layer capacitor 10-1 that can be, similarly to a general electronic component, mounted on a substrate or the like by high-temperature reflow soldering using a lead-free solder can be reliably met.

The support 16 is formed to continuously cover the sealed parts 14a1 to 14a3 of the package 14, one side thereof on which no sealed part is present, and one main surface (lower surface) thereof. In addition, because the support 16 has higher rigidity than the film(s) constructing the package 14, handling or the like of the electrical double layer capacitor 10-1 can be readily performed owing to the support 16.

Figure 5:
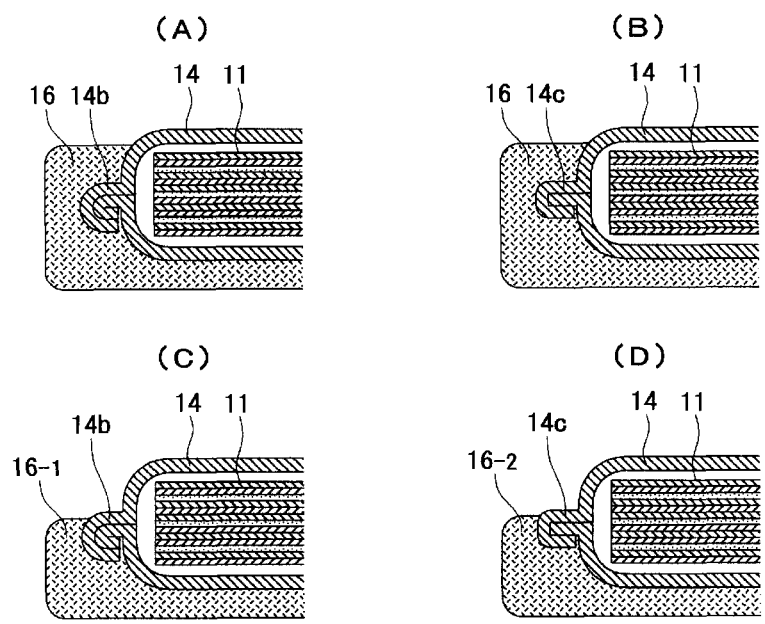
FIG. 5 includes partial longitudinal sectional views showing a first shape variant and second shape variant of a sealed part in the first embodiment, and partial longitudinal sectional views showing a first shape variant and second shape variant of a support.

FIG. 5(A) shows a first shape variant of the sealed parts 14a1 to 14a3. A sealed part 14b shown in the drawing has such a shape that after three side parts in which, for example, heat sealing layers of film(s) are superimposed on each other are sealed by, for example, heat sealing, the ends are folded upward or downward (downward in the drawing). The heat sealing layers are partly present inside each of the folded parts, and the heat sealing layers are partly present in a place in which the heat sealing layers are opposed to each other. The folded part, and the place in which the heat sealing layers are opposed to each other are sealed by heat sealing or the like by utilizing both the heat sealing layers. Due to the shape of the sealed part 14*b*, the strength of the sealed part 14*b* is reinforced by the folded part.

FIG. 5(B) shows a second shape variant of the sealed parts 14*a*1 to 14*a*3. A sealed part 14*c* shown in the drawing has such a shape that after three side parts in which, for example, heat sealing layers of film(s) are superimposed on each other are sealed by, for example, heat sealing, an extension of one side (an upper side in the drawing) of each of the three side parts is folded upward or downward (downward in the drawing) in order to wrap the sealed part. For example, the heat sealing layer is present inside the folded part, and the heat sealing layers are partly present in a place in which the heat sealing layers are opposed to each other. The folded part, and the place in which the heat sealing layers are opposed to each other are sealed by, for example, heat sealing by utilizing both of the heat sealing layers. Due to the shape of the sealed part 14*c*, the strength of the sealed part 14*c* is reinforced by the folded part.

Further, FIG. 5(C) shows a first shape variant of the support 16 in a case where the shape of the sealed part 14*b* shown in FIG. 5(A) is adopted. A support 16-1 shown in the drawing mainly covers the folded part (a part nearly on a lower side below the center) of the sealed part 14*b*, and the upper surface side of the sealed part 14*b* is exposed and not covered by the support 16-1. The support 16-1 does not, unlike the support 16, cover the entire sealed part. Due to the shape of the sealed part 14*b* shown in FIG. 5(A), even when this covering form is adopted for the support, the same advantage can be provided.

Further, FIG. 5(D) shows a second shape variant of the support 16 in a case where the shape of the sealed part 14*d* in FIG. 5(B) is adopted. A support 16-2 shown in the drawing mainly covers the folded part of the sealed part 14*b* (a part nearly on a lower side below the center), and the upper surface side of the sealed part 14*c* is exposed and not covered by the support 16-2. Unlike the support 16, the support 16-2 does not cover the entire sealed part. Due to the shape of the sealed part 14*c* of FIG. 5(B), even when this covering form is adopted for the support, the same advantage can be provided.

Second Embodiment

Figure 6:
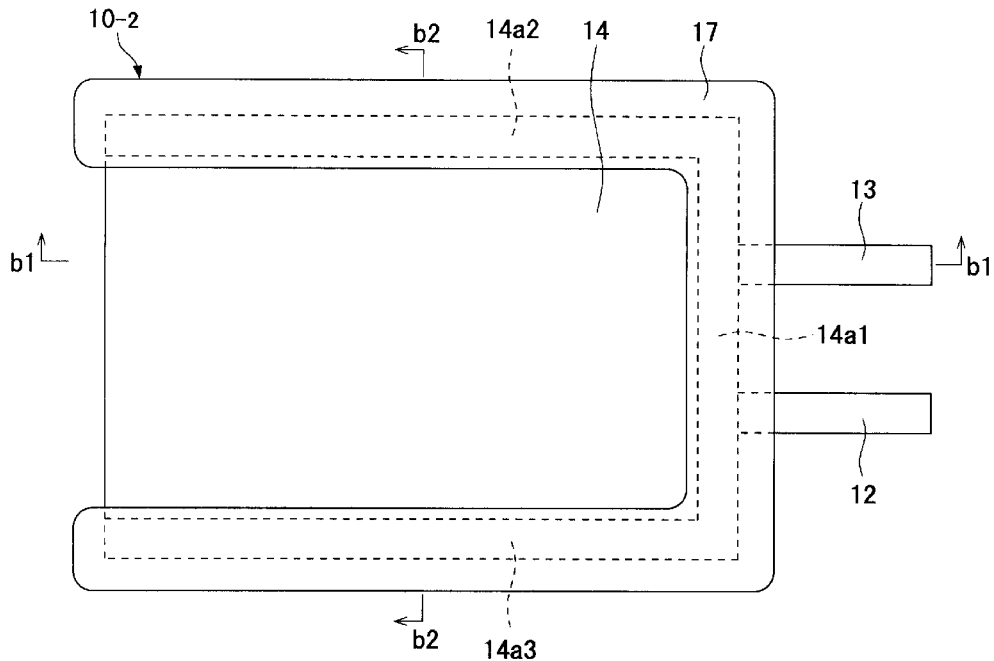
FIG. 6 is a top view of an electrical double layer capacitor showing a second embodiment in which the present invention is applied to the electrical double layer capacitor.
Figure 7:
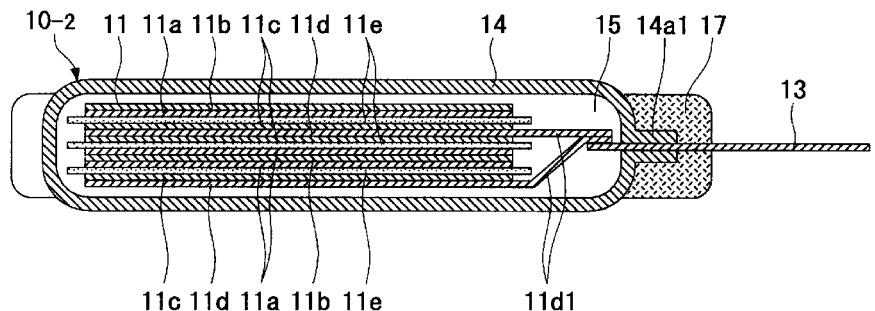
FIG. 7 is a longitudinal sectional view along a b1-b1 line in FIG. 6.
Figure 8:
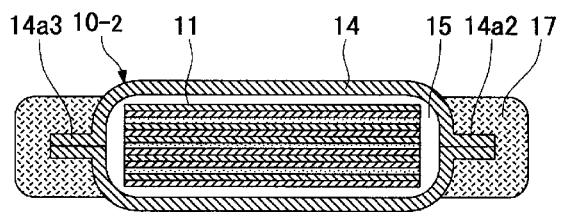
FIG. 8 is a longitudinal sectional view along a b2-b2 line in FIG. 6.

FIG. 6 to FIG. 8 show a second embodiment in which the present invention is applied to an electrical double layer capacitor. FIG. 6 is a top view of the electrical double layer capacitor, FIG. 7 is a longitudinal sectional view along a b1-b1 line in FIG. 6, and FIG. 8 is a longitudinal sectional view along a b2-b2 line in FIG. 6.

An electrical double layer capacitor 10-2 of the second embodiment is different from the construction of the electrical double layer capacitor 10-1 of the first embodiment in the overall shape of a support 17. Because the other components are identical to those of the electrical double layer capacitor 10-1 of the first embodiment, the same reference numerals are cited, and the description is omitted.

The support 17 is formed using the same material as the support 16 of the electrical double layer capacitor 10-1 of the first embodiment so that it can continuously cover solely the sealed parts 14*a*1 to 14*a*3 of the package 14. The support 17 has higher rigidity than the film(s) constructing the package 14. As seen from FIG. 6 to FIG. 8, the upper-surface shape of the support 16 is like a bracket. One side of the package 14 on which no sealed part is present, and parts of a lower surface and an upper surface of the package 14 except three sides thereof are exposed. As seen from FIG. 7 and FIG. 8, the entireties of the sealed parts 14*a*1 to 14*a*3 of the package 14 are covered in a close-contact state with the support 17. Further, as seen from FIG. 7, the proximal parts of the positive-electrode terminal 12 and negative-electrode terminal 13 led out of the sealed part 14*a*1 of the package 14 are covered in the close-contact state with the support 17, while the distal parts of the positive-electrode terminal 12 and negative-electrode terminal 13 jut out from the support 17.

As a method of forming the support 17 using any of the aforesaid materials of E21 to E23, for example, a method (E41) of after using a mould (not shown) that has a cavity shaped in line with the support 17, and inserting the package 14 into the cavity so that the distal parts of the parts of the positive-electrode terminal 12 and negative-electrode terminal 13 which are led out jut out, placing a flowable material into the cavity, hardening the flowable material, and extracting the hardened material from the mould, a method (E42) of forming in advance blocks similar to two parts into which the support 17 shown in FIG. 6 to FIG. 8 is bisected up and down with the sealed parts 14*a*1 to 14*a*3 as a border, sandwiching the package 14 between the two blocks, and joining the blocks, or any other method can be preferably adopted.

Now, a description will be made of an example of a method of mounting the electrical double layer capacitor 10-2 on a circuit board by high-temperature reflow soldering using a lead-free solder.

For mounting the electrical double layer capacitor 10-2 on a circuit board (not shown), the distal parts of the positive-electrode terminal 12 and negative electrode terminal 13 that jut out from the support 17 are disposed on associated lands (not shown) on the circuit board via a solder paste, and the package 14 is disposed on the circuit board.

If the lower-surface height of the distal parts of the positive-electrode terminal 12 and negative electrode terminal 13 is inconsistent with the upper-surface height of the lands with the package 14 disposed on the circuit board, height adjustment is performed by properly folding the distal parts of the positive-electrode terminal 12 and negative electrode terminal 13 prior to disposition.

The circuit board on which the electrical double layer capacitor 10-2 is disposed is placed in a reflow furnace. Parts to be soldered (the distal parts of the positive-electrode terminal 12 and negative electrode terminal 13) are heated at a predetermined temperature (for example, around 250° C.) while being exposed directly to the furnace atmosphere of the reflow furnace in the course of passing through the reflow furnace. The distal parts of the positive-electrode terminal 12 and negative electrode terminal 13 are coupled to the lands via the solder.

Because the entireties of the sealed parts 14*a*1 to 14*a*3 of the package 14 are covered in a close-contact state with the support 17 which has higher rigidity than the film(s) constructing the package 14, deformation of the sealed parts 14*a*1 to 14*a*3 due to heat at the time of reflow soldering and reduction in sealing strength due thereto can be suppressed by the support 17. In addition, a disadvantage such as the one wherein the electrolyte 15 undergoes a vapor pressure rise due to heat and leaks out of the sealed parts 14*a*1 to 14*a*3, can be reliably avoided.

Accordingly, an electrical double layer capacitor 10-2 compatible with high-temperature reflow soldering using a lead-free solder can be provided. Demand for an electrical double layer capacitor 10-2 that can be, similarly to a general electronic component, mounted on a substrate or the like by high-temperature reflow soldering using a lead-free solder, can be reliably met.

In addition, the support 17 is formed to continuously cover solely the sealed parts 14*a*1 to 14*a*3 of the package 14. Moreover, because the support 17 has higher rigidity than the film(s) constructing the package 14, handling or the like of the electronic double-layer capacitor 10-2 can be readily performed owing to the support 17.

For the sealed parts 14a1 to 14a3 of the package 14, the shape of the sealed part 14b shown in FIG. 5(A) or the shape of the sealed part 14c shown in FIG. 5B, which have been described last in the section of the first embodiment, can be optionally adopted.

Figure 9:
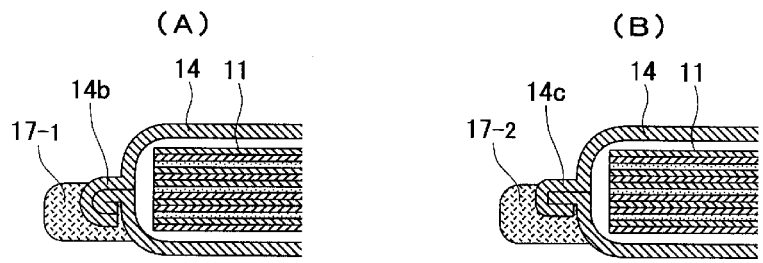
FIG. 9 includes partial longitudinal sectional views showing a first shape variant and second shape variant of a support in the second embodiment.

FIG. 9(A) shows a first shape variant of the support 17 in a case where the shape of the sealed part 14b of FIG. 5(A) is adopted. A support 17-1 shown in the drawing mainly covers the folded part of the sealed part 14b (a part nearly on a lower side below the center), and the upper surface side of the sealed part 14b is exposed and not covered by the support 17-1. Unlike the support 17, the support 17-1 does not cover the entire sealed part. Due to the shape of the sealed part 14b of FIG. 5(A), even if this covering form is adopted for the support, the same advantage can be provided.

FIG. 9(B) shows a second shape variant of the support 17 in a case where the shape of the sealed part 14d of FIG. 5(B) is adopted. A support 17-2 shown in the drawing mainly covers the folded part of the sealed part 14c (a part nearly on a lower side below the center), and the upper-surface side of the sealed part 14c is exposed and not covered by the support 17-2. Unlike the support 17, the support 17-2 does not cover the entire sealed part. Due to the shape of the sealed part 14c of FIG. 5(B), even if this covering form is adopted for the support, the same advantage can be provided.

Third Embodiment

Figure 10:
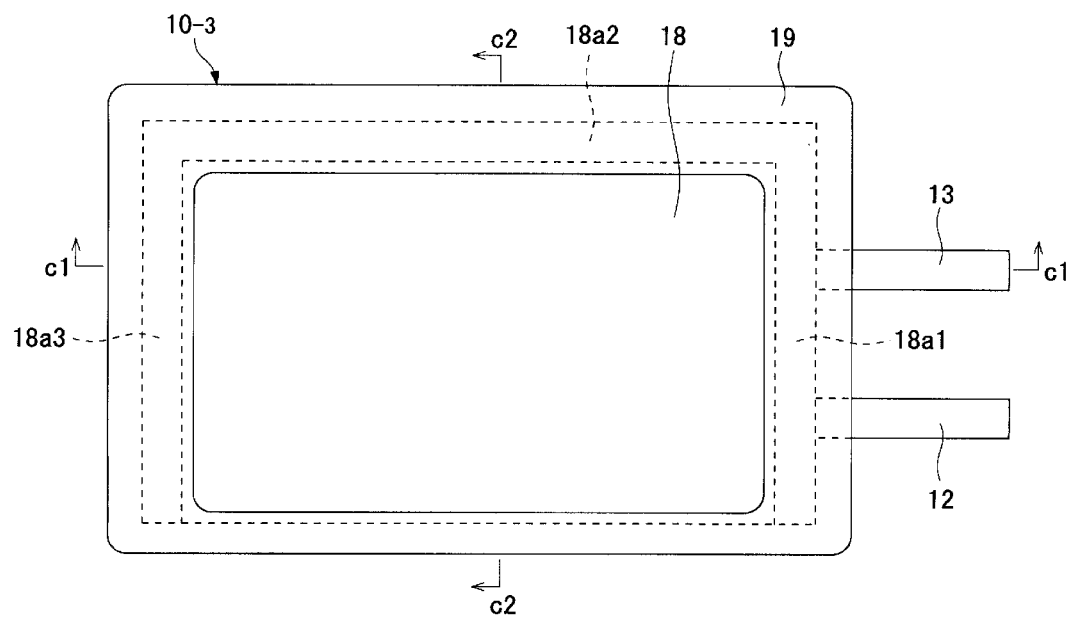
FIG. 10 is a top view of an electrical double layer capacitor showing a third embodiment in which the present invention is applied to the electrical double layer capacitor.
Figure 11:
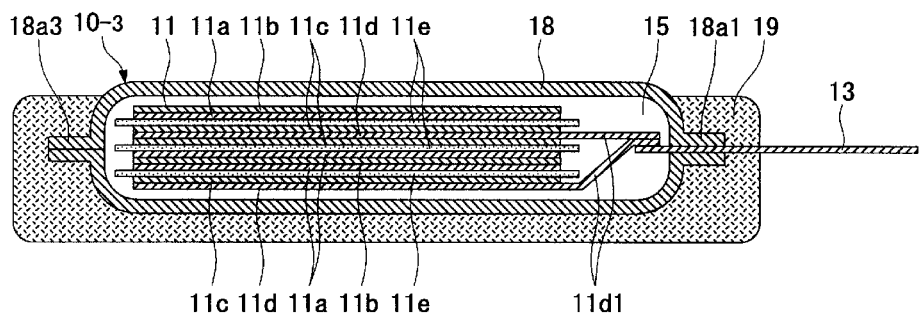
FIG. 11 is a longitudinal sectional view along a c1-c1 line in FIG. 10.
Figure 12:
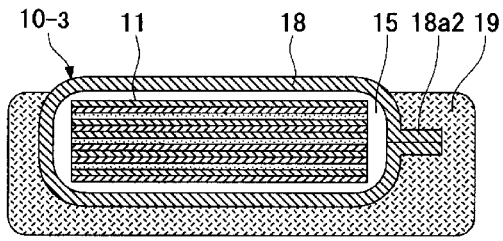
FIG. 12 is a longitudinal sectional view along a c2-c2 line in FIG. 10.

FIG. 10 to FIG. 12 show a third embodiment in which the present invention is applied to an electrical double layer capacitor. FIG. 10 is a top view of the electrical double-layer capacitor, FIG. 11 is a longitudinal sectional view along a c1-c1 line in FIG. 10, and FIG. 12 is a longitudinal sectional view along a c2-c2 line in FIG. 10.

An electrical double layer capacitor 10-3 of the second embodiment is different from the construction of the electrical double layer capacitor 10-1 of the first embodiment in the overall shape of a package 18 and the overall shape of a support 19. Because the other components are identical to those of the electrical double layer capacitor 10-1 of the first embodiment, the same reference numerals are cited and the description is omitted.

The package 18 is formed using the same film as the package 14 of the electrical double layer capacitor 10-1 of the first embodiment is so that the contour thereof becomes rectangular. The package 18 has belt-like sealed parts 18a1 to 18a3 continuously on three sides thereof (a right side, an upper side, and a left side in FIG. 10). The electric storage element 11, one end part of the positive-electrode terminal 12, one end part of the negative-electrode terminal 13, and the electrolyte 15 are enclosed in the package 18, while the other end part of the positive-electrode terminal 12 and the other end part of the negative-electrode terminal 13 are led out of the sealed part 18a1. As for enclosure of the electrolyte 15, a method of impregnating in advance the electric storage element 11 with the electrolyte 15 before forming the package 18, a method of, after forming the package 18, pouring the electrolyte 15 into the inside of the package 18 through a hole formed in advance and then blocking the hole, or any other method can be adopted.

As a method of forming the package 18 using any of the laminated films E1 to E3 or the single layer film E4, for example, a method (E51) of after preparing a rectangular film of a predetermined size and disposing the electric storage element 11 on the sealing layer side of the rectangular film, folding the rectangular film in the center thereof, and sealing three side parts, in which, for example, the heat sealing layers of the film(s) are superimposed on each other, by heat sealing or the like, or any other method can be preferably adopted.

The support 19 is formed using the same material as the support 16 of the electrical double layer capacitor 10-1 of the first embodiment is so that it continuously covers the sealed parts 18a1 to 18a3 of the package 18, one side thereof on which no sealed part is present, and one main surface thereof (lower surface). The support 19 has higher rigidity than the film(s) constructing the package 18. As seen from FIG. 10 to FIG. 12, the upper surface of the support 19 is rectangular-frame shaped, and a part of the upper surface of the package 18 except four sides thereof is exposed. As seen from FIG. 11 and FIG. 12, the entireties of the sealed parts 18a1 to 18a3 of the package 18 are covered in a close-contact state with the support 19. Further, as seen from FIG. 11, the proximal parts of the positive-electrode terminal 12 and negative-electrode terminal 13 led out of the sealed part 18a1 of the package 18 are covered in the close-contact state with the support 19, while the distal parts of the positive-electrode terminal 12 and negative-electrode terminal 13 jut out from the support 19.

As a method of forming the support 19 using any of the materials E21 to E23, for example, a method (E61) of after using a mould (not shown) that has a cavity shaped in line with the support 19, and inserting the package 18 into the cavity so that the distal parts of the parts of the positive-electrode terminal 12 and negative-electrode terminal 13 which are led out jut out, placing a flowable material into the cavity, hardening the material, and extracting the hardened material from the mould, a method (E62) of forming in advance blocks similar to portions into which the support 19 shown in FIG. 10 to FIG. 12 is bisected up and down with the sealed parts 18a1 to 18a3 as a border, sandwiching the package 18 between the two blocks, and joining the blocks, or any other method can be preferably adopted.

Now, a description will be made of an example of a method of mounting the electrical double layer capacitor 10-3 on a circuit board by high-temperature reflow soldering using a lead-free solder.

For mounting the electrical double layer capacitor 10-3 on a circuit board (not shown), the distal parts of the positive-electrode terminal 12 and negative-electrode terminal 13 that jut out from the support 19 are disposed on associated lands (not shown) on the circuit board via a solder paste, and the support 19 is disposed on the circuit board.

If the lower-surface height of the distal parts of the positive-electrode terminal 12 and negative-electrode terminal 13 is inconsistent with the upper-surface height of the lands with the support 19 disposed on the circuit board, height adjustment is performed by properly folding the distal parts of the positive-electrode terminal 12 and negative-electrode terminal 13 prior to disposition.

The circuit board on which the electrical double layer capacitor 10-3 is mounted is placed in a reflow furnace. Parts to be soldered (the distal parts of the positive-electrode terminal 12 and negative-electrode terminal 13) are heated at a predetermined temperature (for example, around 250° C.) while being exposed directly to the furnace atmosphere of the reflow furnace in the course of passing through the reflow furnace. The distal parts of the positive-electrode terminal 12 and negative-electrode terminal 13 are coupled to the lands via the solder.

Because the entireties of the sealed parts 18a1 to 18a3 of the package 18 are covered in a close-contact state with the support 19 having higher rigidity than the film(s) constructing the package 18, deformation of the sealed parts 18a1 to 18a3 due to heat at the time of reflow soldering and reduction in sealing strength due thereto can be suppressed with the support 19. In addition, a disadvantage such as the one wherein the electrolyte 15 undergoes a vapor pressure rise due to heat and leaks out of the sealed parts 18a1 to 18a3 can be reliably avoided.

Accordingly, an electrical double layer capacitor 10-3 compatible with high-temperature reflow soldering using a lead-free solder can be provided. Demand for an electrical double layer capacitor that 10-3 can be, similarly to a general electronic component, mounted on a substrate or the like by high-temperature reflow soldering using a lead-free solder can be reliably met.

In addition, the support 19 is formed to continuously cover the sealed parts 18a1 to 18a3 of the package, one side thereof on which no sealed part is present, and one main surface (lower surface) thereof. Moreover, because the support 19 has higher rigidity than the film(s) constructing the package 18, handling or the like of the electrical double layer capacitor 10-3 can be readily performed owing to the support 19.

For the sealed parts 18a1 to 18a3 of the package 18, the shape of the sealed part 14b shown in FIG. 5(A) and the shape of the sealed part 14c shown in FIG. 5(B), which have been described last in the paragraph of the first embodiment, can be optionally adopted.

For the support 19 in a case where the shape of the sealed part 14b of FIG. 5(A) is adopted, the shape of the support 16-1 shown in FIG. 5(C) and the covering form thereof, which have been described last in the section of the first embodiment, can be optionally adopted. For the support 19 in a case where the shape of the sealed part 14c of FIG. 5(B) is adopted, the shape of the support 16-2 shown in FIG. 5(D) and the covering form thereof, which have been described last in the section of the first embodiment, can be optionally adopted.

Fourth Embodiment

Figure 13:
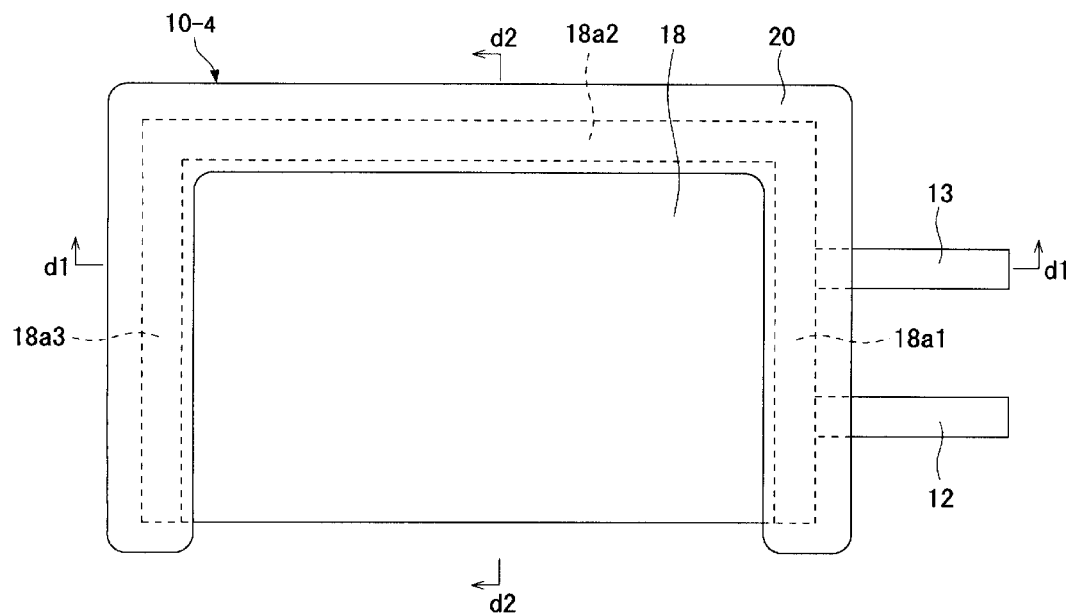
FIG. 13 is a top view of an electrical double layer capacitor showing a fourth embodiment in which the present invention is applied to the electrical double layer capacitor.
Figure 14:
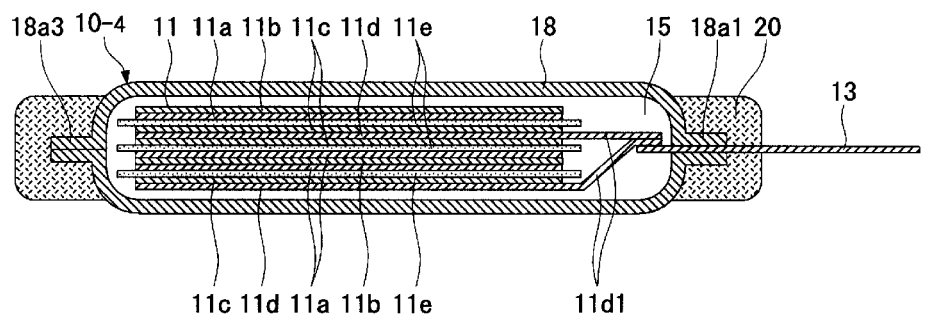
FIG. 14 is a longitudinal sectional view along a d1-d1 line in FIG. 13.
Figure 15:
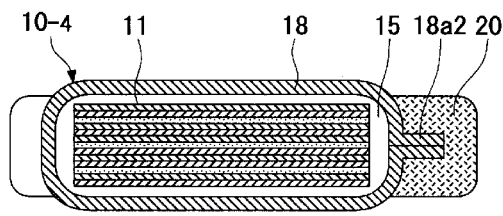
FIG. 15 is a longitudinal sectional view along a d2-d2 line in FIG. 13.

FIG. 13 to FIG. 15 show a fourth embodiment in which the present invention is applied to an electrical double layer capacitor. FIG. 13 is a top view of the electrical double layer capacitor, FIG. 14 is a longitudinal sectional view along a d1-d1 line in FIG. 13, and FIG. 15 is a longitudinal sectional view along a d2-d2 line in FIG. 13.

An electrical double layer capacitor 10-4 of the fourth embodiment is different from the construction of the electrical double layer capacitor 10-3 of the third embodiment in the overall shape of a support 20. Because the other components are identical to those of the electrical double layer capacitor 10-3 of the third embodiment, the same reference numerals are cited and the description thereof is omitted.

The support 20 is formed using the same material as the support 16 of the electrical double layer capacitor 10-1 of the first embodiment is so that it continuously covers the sealed parts 18a1 to 18a3 of the package 18. The support 20 has higher rigidity than the film(s) constructing the package 18. As seen from FIG. 13 to FIG. 15, the upper-surface shape of the support 20 is like a bracket. One side of the package 18 on which no sealed part is present, and parts of the lower surface and upper surface thereof except three sides thereof are exposed. As seen from FIG. 14 and FIG. 15, the entireties of the sealed parts 18a1 to 18a3 of the package 18 are covered in a close-contact state with the support 20. Further, as seen from FIG. 14, the proximal parts of the positive-electrode terminal 12 and negative-electrode terminal 13 led out of the sealed part 18a1 of the package 18 are covered in the close-contact state with the support 20, while the distal parts of the positive-electrode terminal 12 and negative-electrode terminal 13 jut out from the support 20.

As a method of forming the support 20 using any of the materials E21 to E23, for example, a method (E71) of after using a mould (not shown) that has a cavity shaped in line with the support 20, and inserting the package 18 into the cavity so that the distal parts of the parts of the positive-electrode terminal 12 and negative-electrode terminal 13 which are led out jut out, placing a flowable material into the cavity, hardening the material, and extracting the hardened material from the mould, a method (E72) of forming in advance blocks similar to two portions into which the support 20 shown in FIG. 13 to FIG. 15 is bisected up and down with the sealed parts 18a1 to 18a3 as a border, sandwiching the package 18 between the two blocks, and joining the blocks, or any other method can be preferably adopted.

Now, a description will be made of an example of a method of mounting the electrical double layer capacitor 10-4 on a circuit board by high-temperature reflow soldering using a lead-free solder.

For mounting the electrical double layer capacitor 10-4 on the circuit board (not shown), the distal parts of the positive-electrode terminal 12 and negative-electrode terminal 13 that jut out from the support 20 are disposed on associated lands (not shown) on the circuit board via a solder paste, and the package 18 is disposed on the circuit board.

If the lower-surface height of the distal parts of the positive-electrode terminal 12 and negative-electrode terminal 13 is inconsistent with the upper-surface height of the lands with the package 18 disposed on the circuit board, height adjustment is performed by properly folding the distal parts of the positive-electrode terminal 12 and negative-electrode terminal 13 prior to the disposition.

The circuit board on which the electrical double layer capacitor 10-4 is disposed is placed in a reflow furnace. Parts to be soldered (the distal parts of the positive-electrode terminal 12 and negative-electrode terminal 13) are heated at a predetermined temperature (for example, around 250° C.) while being exposed directly to the furnace atmosphere of the reflow furnace in the course of passing through the reflow furnace. The distal parts of the positive-electrode terminal 12 and negative-electrode terminal 13 are coupled to the lands via the solder.

Because the entireties of the sealed parts 18a1 to 18a3 of the package 18 are covered in a close-contact state with the support 20 which has higher rigidity than the film(s) constructing the package 18, deformation of the sealed parts 18a1 to 18a3 due to heat at the time of reflow soldering and reduction in sealing strength due thereto can be suppressed by the support 20. In addition, a disadvantage such as the one wherein the electrolyte 15 undergoes a vapor pressure rise due to heat and leaks out of the sealed parts 18a1 to 18a3 can be reliably avoided.

Accordingly, an electrical double layer capacitor 10-4 compatible with high-temperature reflow soldering using a lead-free solder can be provided. Demand for an electrical double layer capacitor 10-4 that can be, similarly to a general electric part, mounted on a substrate or the like by high-temperature reflow soldering using a lead-free solder can be reliably met.

In addition, the support 20 is formed to continuously cover solely the sealed parts 18a1 to 18a3 of the package 18. Moreover, because the support 20 has higher rigidity than the film(s) constructing the package 18, handling or the like of the electrical double layer capacitor 10-4 can be readily performed owing to the support 20.

For the sealed parts 18a1 to 18a3 of the package 18, the shape of the sealed part 14b shown in FIG. 5(A) and the shape of the sealed part 14c shown in FIG. 5(B), which have been described last in the section of the first embodiment, can be optionally adopted.

In addition, for the support 20 in a case where the shape of the sealed part 14b of FIG. 5(A) is adopted, the shape of the support 17-1 shown in FIG. 9(A) and the covering form thereof, which have been described last in the section of the second embodiment, can be optionally adopted. Moreover, for the support 20 in a case where the shape of the sealed part 14c of FIG. 5(B) is adopted, the shape of the support 17-2 shown in FIG. 9(B) and the covering form thereof, which have been described last in the section of the second embodiment, can be optionally adopted.

Fifth Embodiment

Figure 16:
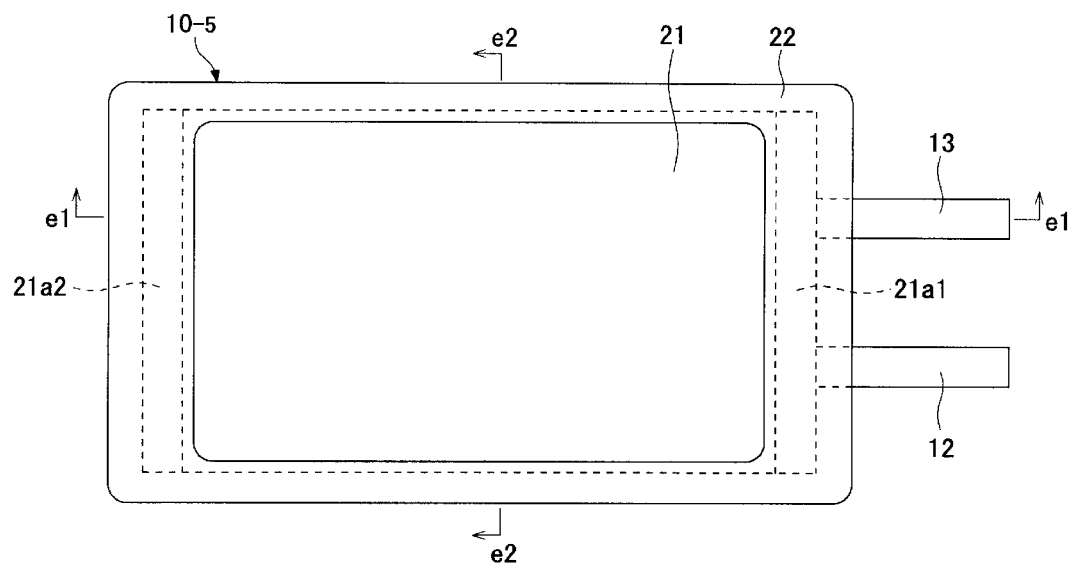
FIG. 16 is a top view of an electrical double layer capacitor showing a fifth embodiment in which the present invention is applied to the electrical double layer capacitor.
Figure 17:
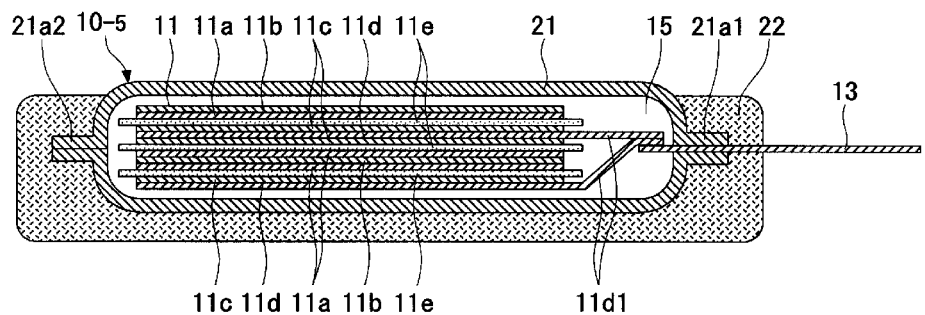
FIG. 17 is a longitudinal sectional view along an e1-e1 line in FIG. 16.
Figure 18:
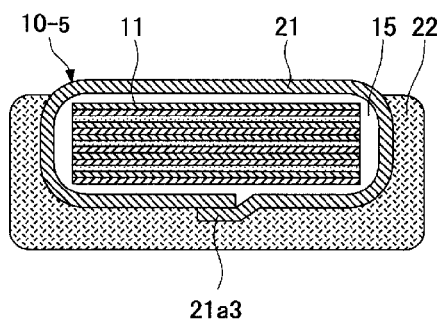
FIG. 18 is a longitudinal sectional view along an e2-e2 line in FIG. 16.

FIG. 16 to FIG. 18 show a fifth embodiment in which the present invention is applied to an electrical double layer capacitor. FIG. 16 is a top view of the electrical double layer capacitor, FIG. 17 is a longitudinal sectional view along an e1-e1 line in FIG. 16, and FIG. 18 is a longitudinal sectional view along an e2-e2 line in FIG. 16.

An electrical double layer capacitor 10-5 of the fifth embodiment is different from the construction of the electrical double layer capacitor 10-1 of the first embodiment in the overall shape of a package 21 and the overall shape of a support 22. Because the other components are identical to those of the electrical double layer capacitor 10-1 of the first embodiment, the same reference numerals are cited and the description thereof is omitted.

The package 21 is formed using a film or films to be described later so that the contour thereof becomes rectangular, and has belt-like sealed parts 21a1 to 21a3 continuously on two opposite sides (a right side and a left side in FIG. 16) and on one main surface (lower surface). The electric storage element 11, one end part of the positive-electrode terminal 12, one end part of the negative-electrode terminal 13, and the electrolyte 15 are enclosed in the package 21, while the other end parts of the positive-electrode terminal 12 and negative-electrode terminal 13 are led out of the sealed part 21a1 of the package 21. As for enclosure of the electrolyte 15, aside from a method of impregnating in advance the electric storage element 11 with the electrolyte 15 before forming the package 21, a method of, after forming the package 21, pouring the electrolyte 15 into the inside of the package 21 through a hole formed in advance and then blocking the hole, or any other method can be adopted.

For the film to be used to form the package 21, for example, a laminated film (E81) having another sealing layer, which corresponds to the sealed part 21a3, partly formed in one side part of the protective layer L1 of the laminated film E1, a laminated film (E82) having the sealing layer L4 of the laminated film E81 formed on the perimeter thereof alone, or any other film can be preferably adapted. Needless to say, a laminated film having the insulating layer L3 removed from the laminated film E81 and having the sealing layer L4 made sufficiently thick, a single layer film (E84) of only the sealing layer L4 having a sufficient thickness, or any other film may be adapted.

As a method of forming the package 21 using any of the laminated films E81 to E83 or the single layer film E84, for example, a method (E91) of after preparing a rectangular film of a predetermined size and disposing the electric storage element 11 or the like on the sealing layer side of the rectangular film, folding both edge parts of the rectangular film, sealing parts, in which, for example, the heat sealing layers of the film(s) are superimposed on each other, on one main surface side (lower-surface side) by heat sealing or the like, and sealing two side parts, in which the sealing layers are superimposed on each other, by, for example, heat sealing, or any other method can be preferably adopted.

The support 22 is formed using the same material as the support 16 of the electrical double layer capacitor 10-1 of the first embodiment is so that it continuously covers the sealed parts 21a1 and 21a2 of the package 21, two sides thereof on which no sealed part is present, one main surface (lower surface) thereof, and the sealed part 21a3 present on the one main surface (lower surface). The support 22 has higher rigidity than the film(s) constructing the package 21. As seen from FIG. 16 to FIG. 18, the upper surface of the support 22 is rectangular-frame shaped, and a part of the upper surface of the package 21 except four sides thereof is exposed. As seen from FIG. 17 and FIG. 18, the entireties of the sealed parts 21a1 to 21a3 of the package 21 are covered in a close-contact state with the support 22. Further, as seen from FIG. 17, the proximal parts of the positive-electrode terminal 12 and negative-electrode terminal 13 led out of the sealed part 21a1 of the package 21 are covered in the close-contact state with the support 22. The distal parts of the positive-electrode terminal 12 and negative-electrode terminal 13 jut out from the support 22.

As a method of forming the support 22 using any of the materials E21 to E23, for example, a method (E101) of after using a mould (not shown) that has a cavity shaped in line with the support 22 and inserting the package 21 into the cavity so that the distal parts of the parts of the positive-electrode terminal 12 and negative-electrode terminal 13 which are led out jut out, placing a flowable material into the cavity, hardening the material, and extracting the hardened material from the mould, a method (E102) of forming in advance blocks similar to portions into which the support 22 shown in FIG. 16 to FIG. 18 is bisected up and down with the sealed parts 21a1 and 21a2 as a border, sandwiching the package 21 between the two blocks, and joining the blocks, or any other method can be preferably adopted.

Now, a description will be made of an example of a method of mounting the electrical double layer capacitor 10-5 on a circuit board by high-temperature reflow soldering using a lead-free solder.

For mounting the electrical double layer capacitor 10-5 on a circuit board (not shown), the distal parts of the positive-electrode terminal 12 and negative-electrode terminal 13 that jut out from the support 22 are disposed on associated lands (not shown) on the circuit board via a solder paste, and the support 22 is disposed on the circuit board.

If the lower-surface height of the distal parts of the positive-electrode terminal 12 and negative-electrode terminal 13 is inconsistent with the upper-surface height of the lands with the support 22 disposed on the circuit board, height adjustment is performed by properly folding the distal parts of the positive-electrode terminal 12 and negative-electrode terminal 13 prior to disposition.

The circuit board on which the electrical double layer capacitor 10-5 is disposed is placed in a reflow furnace. Parts to be soldered (the distal parts of the positive-electrode terminal 12 and negative-electrode terminal 13) are heated at a predetermined temperature (for example, around 250° C.) while being exposed directly to the furnace atmosphere of the reflow furnace in the course of passing through the reflow furnace. The distal parts of the positive-electrode terminal 12 and negative-electrode terminal 13 are coupled to the lands via the solder.

Because the entireties of the sealed parts 21a1 to 21a3 of the package 21 are covered in a close-contact state with the support 22 having higher rigidity than the film(s) constructing the package 21, deformation of the sealed parts 21a1 to 21a3 due to heat at the time of reflow soldering and reduction in sealing strength due thereto can be suppressed by the support 22. In addition, a disadvantage such as the one wherein the electrolyte 15 undergoes a vapor pressure rise due to heat and leaks out of the sealed parts 21a1 to 21a3 can be reliably avoided.

Accordingly, an electrical double layer capacitor 10-5 compatible with high-temperature reflow soldering using a lead-free solder can be provided. Demand for an electrical double layer capacitor 10-5 that can be, similarly to a general electronic component, mounted on a substrate or the like by high-temperature reflow soldering using a lead-free solder can be reliably met.

In addition, the support 22 is formed to continuously cover the sealed parts 21a1 and 21a2 of the package 21, two sides thereof on which no sealed part is present, one main surface (lower surface) thereof, and the sealed part 21a3 present on the one main surface (lower surface). Moreover, because the support 22 has higher rigidity than the film(s) constructing the package 21, handling or the like of the electrical double layer capacitor 10-5 can be readily performed owing to the support 22.

For the sealed parts 21a1 and 21a2 of the package 21, the shape of the sealed part 14b shown in FIG. 5(A) and the shape of the sealed part 14c shown in FIG. 5(B), which have been described last in the section of the first embodiment, can be optionally adopted.

For the support 22 in a case where the shape of the sealed part 14b of FIG. 5(A) is adopted, the shape of the support 16-1 shown in FIG. 5(C) and the covering form thereof, which have been described last in the paragraph of the first embodiment, can be optionally adopted. For the support 22 in a case where the shape of the sealed part 14c of FIG. 5(B) is adopted, the shape of the support 16-2 shown in FIG. 5(D) and the covering form thereof, which have been described last in the section of the first embodiment, can be optionally adopted.

Sixth Embodiment

Figure 19:
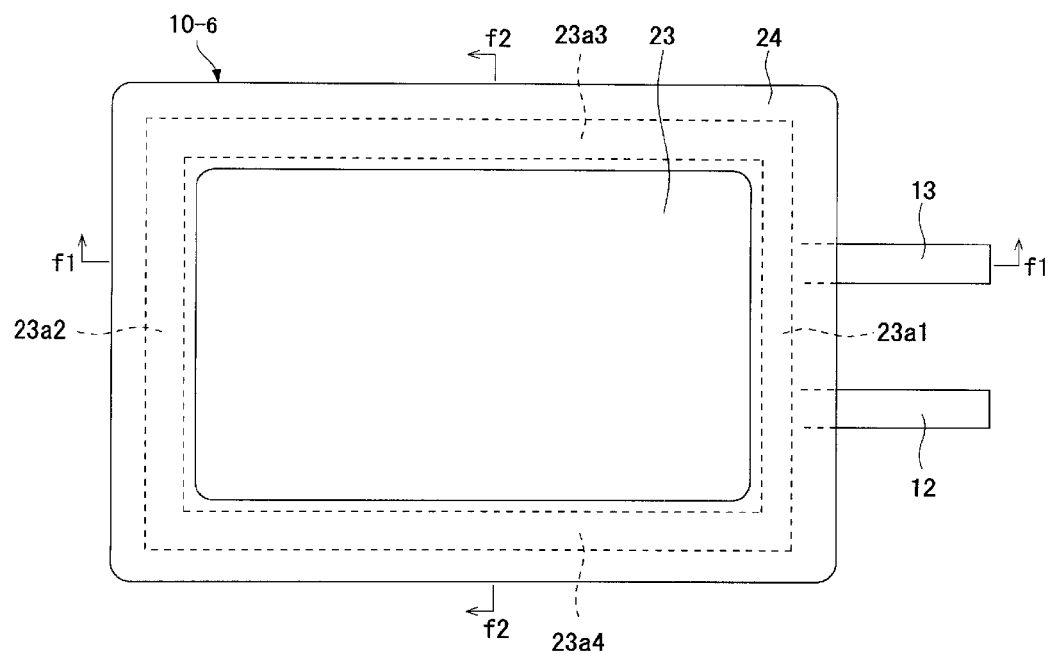
FIG. 19 is a top view of an electrical double layer capacitor showing a sixth embodiment in which the present invention is applied to the electrical double layer capacitor.
Figure 20:
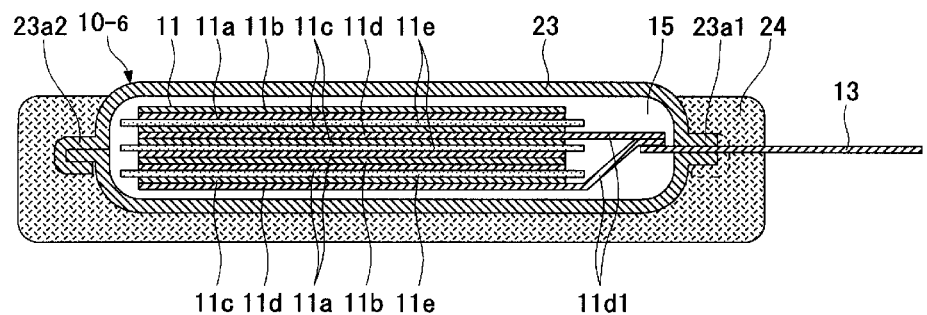
FIG. 20 is a longitudinal sectional view along an f1-f1 line in FIG. 22.
Figure 21:
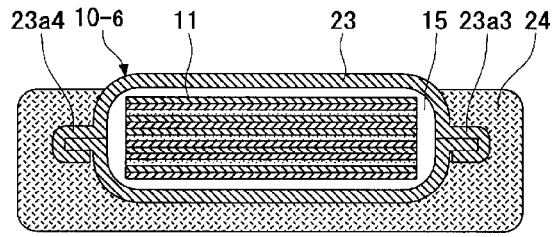
FIG. 21 is a longitudinal sectional view along an f2-f2 line in FIG. 22.
Figure 22:
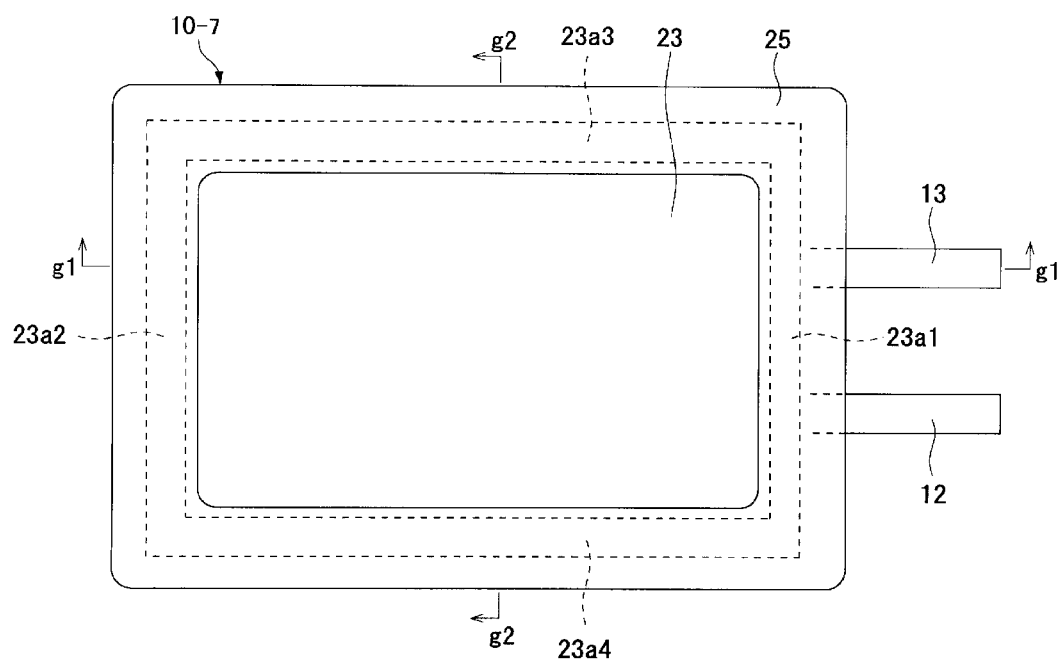
FIG. 22 is a top view of an electrical double layer capacitor showing a seventh embodiment in which the present invention is applied to the electrical double layer capacitor.

FIG. 19 to FIG. 21 show a sixth embodiment in which the present invention is applied to an electrical double layer capacitor. FIG. 19 is a top view of the electrical double layer capacitor, FIG. 20 is a longitudinal sectional view along an f1-f1 line in FIG. 22, and FIG. 21 is a longitudinal sectional view along an f2-f2 line in FIG. 22.

An electrical double layer capacitor 10-6 of the sixth embodiment is different from the construction of the electrical double layer capacitor 10-1 of the first embodiment in the overall shape of a package 23 and the overall shape of a support 24. Because the other components are identical to those of the electrical double layer capacitor 10-1 of the first embodiment, the same reference numerals are cited and the description thereof is omitted.

The package 23 is formed using a film or films to be described later so that the contour thereof becomes rectangular, and has belt-like sealed parts 23a1 to 23a4 continuously on four sides thereof (a right side, a left side, an upper side, and a lower side in FIG. 19). The electric storage element 11, one end part of the positive-electrode terminal 12, one end part of the negative-electrode terminal 13, and the electrolyte 15 are enclosed in the package 23, while the other end part of the positive-electrode terminal 12 and the other end part of the negative-electrode terminal 13 are led out of the sealed part 23a1 of the package 23. As for enclosure of the electrolyte 15, aside from a method of impregnating in advance the electric storage element 11 with the electrolyte 15 before forming the package 23, a method of pouring the electrolyte 15 into the inside of the package 23 through a hole formed in advance, and then blocking the hole, or any other method can be adopted.

As the film to be used to form the package 23, for example, a combination (E111) of the laminated film E1 (for an upper side) and a laminated film (for a lower side) having another sealing layer, which corresponds to the sealed parts 23a1 to 23a4, partly formed in four side parts of the protective layer L1 of the laminated film E1, a combination of laminated films each having the sealing layer L4 of the upper-side laminated film or lower-side laminated film of E111 formed on the perimeter thereof alone, or any other combination can be preferably adapted. Needless to say, a combination (E113) of laminated films each having the insulating layer L3 removed from the upper-side laminated film or lower-side laminated film of E111 and having the sealing layer made sufficiently thick, a combination (E114) of single-layer films (for both the upper and lower sides) of only the sealing layer L4 having a sufficient thickness, or any other combination may be adopted.

As a method of forming the package 23 using any of the laminated films E111 to E113 or the single layer film E114, for example, a method (E121) of after preparing a rectangular film for an upper side of a predetermined size and a rectangular film for a lower side having a smaller size and disposing the electric storage element 11 on the sealing layer side of the lower-side rectangular film, covering the electric storage element with the upper-side rectangular film, folding four sides of the upper-side rectangular film, and sequentially sealing parts, in which the sealing layers are superimposed on each other, by heat sealing or the like, or any other method can be preferably adopted. Incidentally, when one side, which corresponds to the sealed part 23a1, out of the four sides of the upper-side rectangular film is folded, notches for avoiding interference with the positive-electrode terminal 12 and negative-electrode terminal 13 should be formed in advance in the one side of the rectangular film.

The support 24 is formed using the same material as the support 16 of the electrical double layer capacitor 10-1 of the first embodiment is so that it continuously covers the sealed parts 23a1 to 23a4 of the package 23, and one main surface (lower surface) thereof. The support 24 has higher rigidity than the film(s) constructing the package 23. As seen from FIG. 19 to FIG. 21, the upper surface of the support 24 is rectangular-frame shaped, and a part of the upper surface of the package 23 except the four sides thereof is exposed. As shown in FIG. 20 and FIG. 21, the entireties of the sealed parts 23a1 to 23a4 of the package 23 are covered in a close-contact state with the support 24. Further, as seen from FIG. 20, the proximal parts of the positive-electrode terminal 12 and negative-electrode terminal 13 led out of the sealed part 23a1 of the package 23 are covered in the close-contact state with the support 24, while the distal parts of the positive-electrode terminal 12 and negative-electrode terminal 13 jut out from the support 24.

As a method of forming the support 24 using any of the materials E23 to E23, for example, a method (E131) of after using a mould (not shown) that has a cavity shaped in line with the support 24 and inserting the package 23 into the cavity so that the distal parts of the parts of the positive-electrode terminal 12 and negative-electrode terminal 13 which are led out jut out, placing a flowable material into the cavity, hardening the material, and extracting the hardened material from the mould, a method (E132) of forming in advance blocks similar to portions into which the support 24 shown in FIG. 19 to FIG. 21 is bisected up and down with the sealed parts 23a1 to 23a4 as a border, sandwiching the package 23 between the two blocks, and joining the blocks, or any other method can be preferably adopted.

Now, a description will be made of an example of a method of mounting the electrical double layer capacitor 10-6 on a circuit board by high-temperature reflow soldering using a lead-free solder.

For mounting the electrical double layer capacitor 10-6 on a circuit board (not shown), the distal parts of the positive-electrode terminal 12 and negative-electrode terminal 13 that jut out from the support 24 are disposed on associated lands (not shown) on the circuit board via a solder paste, and the support 24 is disposed on the circuit board.

If the lower-surface height of the distal parts of the positive-electrode terminal 12 and negative-electrode terminal 13 is inconsistent with the upper-surface height of the lands with the support 24 disposed on the circuit board, height adjustment is performed by properly folding the distal parts of the positive-electrode terminal 12 and negative-electrode terminal 13 prior to disposition.

The circuit board on which the electrical double layer capacitor 10-6 is disposed is placed in a reflow furnace. Parts to be soldered (the distal parts of the positive-electrode terminal 12 and negative-electrode terminal 13) are heated at a predetermined temperature (for example, around 250° C.) while being exposed directly to the furnace atmosphere of the reflow furnace in the course of passing through the reflow furnace. The distal parts of the positive-electrode terminal 12 and negative-electrode terminal 13 are coupled to the lands via the solder.

Because the entireties of the sealed parts 23a1 to 23a4 of the package 23 are covered in a close-contact state with the support 24 having higher rigidity than the film(s) made into the package 23, deformation of the sealed parts 23a1 to 23a4 due to heat at the time of reflow soldering, and reduction in sealing strength due thereto can be suppressed by the support 24. In addition, a disadvantage such as the one wherein the electrolyte 15 undergoes a vapor pressure rise due to the heat and leaks out of the sealed parts 23a1 to 23a4 can be reliably avoided.

Accordingly, an electrical double layer capacitor 10-6 compatible with high-temperature reflow soldering using a lead-free solder can be provided. Demand for an electrical double layer capacitor 10-6 that can be, similarly to a general electronic component, mounted on a substrate or the like by high-temperature reflow soldering using a lead-free solder can be reliably met.

In addition, the support 24 is formed to continuously cover the sealed parts 23a1 to 23a4 of the package 23 and one main surface (lower surface) thereof. Moreover, the support 24 has higher rigidity than the film(s) constructing the package 23. Therefore, handling or the like of the electrical double layer capacitor 10-6 can be readily performed owing to the support 24.

For the support 24, the shape of the support 16-2 shown in FIG. 5(D) and the covering form thereof, which have been described last in the section of the first embodiment, can be adopted.

Seventh Embodiment

Figure 23:
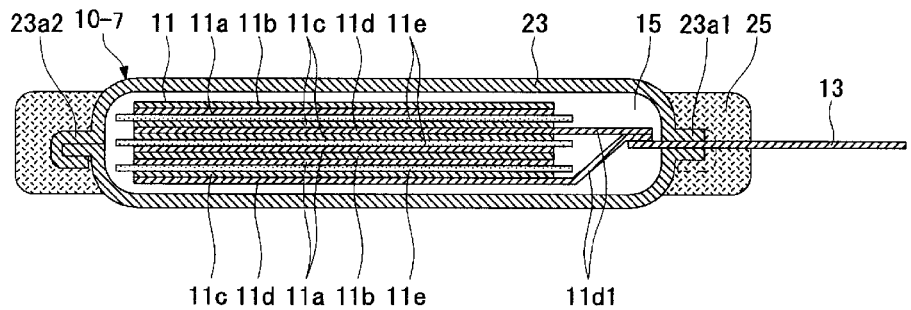
FIG. 23 is a longitudinal sectional view along a g1-g1 line in FIG. 24.
Figure 24:
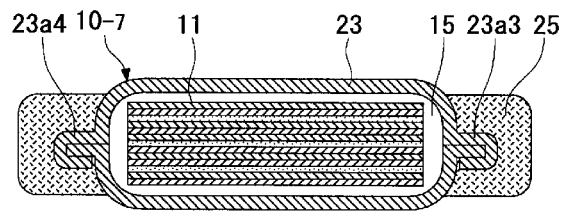
FIG. 24 is a longitudinal sectional view along a g2-g2 line in FIG. 24.

FIG. 22 to FIG. 24 show a seventh embodiment in which the present invention is applied to an electrical double layer capacitor. FIG. 22 is a top view of the electrical double layer capacitor, FIG. 23 is a longitudinal sectional view along a g1-g1 line in FIG. 22, and FIG. 24 is a longitudinal sectional view along a g2-g2 line in FIG. 22.

An electrical double layer capacitor 10-7 of the seventh embodiment is different from the construction of the electrical double layer capacitor 10-6 of the sixth embodiment in the overall shape of a support 25. Because the other components are identical to those of the electrical double layer capacitor 10-6 of the sixth embodiment, the same reference numerals are cited and the description thereof is omitted.

The support 25 is formed using the same material as the support 16 of the electrical double layer capacitor 10-1 of the first embodiment is so that it continuously covers solely the sealed parts 23a1 to 23a4 of the package 23. The support 25 has higher rigidity than the film(s) constructing the package 23. As seen from FIG. 22 to FIG. 24, the upper surface of the support 24 is rectangular-frame shaped, and parts of the lower surface and upper surface of the package 23 except four sides thereof are exposed. As seen from FIG. 23 and FIG. 24, the entireties of the sealed parts 23a1 to 23a4 of the package 23 are covered in a close-contact state with the support 24. Further, as shown in FIG. 23, the proximal parts of the positive-electrode terminal 12 and negative-electrode terminal 13 led out of the sealed part 23a1 of the package 23 are covered in the close-contact state with the support 25, while the distal parts of the positive-electrode terminal 12 and negative-electrode terminal 13 jut out from the supports 25.

As a method of forming the support 25 using any of the materials E21 to E23, for example, a method (E141) of after using a mould (not shown) that has a cavity shaped in line with the support 25, and inserting the package 23 into the cavity so that the distal parts of the parts of the positive-electrode terminal 12 and negative-electrode terminal 13 which are led out jut out, placing a flowable material into the cavity, hardening the material, and extracting the hardened material from the mould, a method (E142) of forming in advance blocks similar to portions into which the support 25 shown in FIG. 22 to FIG. 24 is bisected up and down with the sealed parts 23a1 to 23a4 as a border, sandwiching the package 23 between the two blocks, and joining the blocks, or any other method can be preferably adopted.

Now, a description will be made of an example of a method of mounting the electrical double layer capacitor 10-7 on a circuit board by high-temperature reflow soldering using a lead-free solder.

For mounting the electrical double layer capacitor 10-7 on a circuit board (not shown), the distal parts of the positive-electrode terminal 12 and negative-electrode terminal 13 that jut out from the support 25 are disposed on associated lands (not shown) via a solder paste, and the package 23 is disposed on the circuit board.

If the lower-surface height of the distal parts of the positive-electrode terminal 12 and negative-electrode terminal 13 is inconsistent with the upper-surface height of the lands with the package 23 disposed on the circuit board, height adjustment is performed by properly folding the distal parts of the positive-electrode terminal 12 and negative-electrode terminal 13 prior to disposition.

The circuit board on which the electrical double layer capacitor 10-7 is disposed is placed in a reflow furnace. Parts to be soldered (the distal parts of the positive-electrode terminal 12 and negative-electrode terminal 13) are heated at a predetermined temperature (for example, around 250° C.) while being exposed directly to the furnace atmosphere of the reflow furnace in the course of passing through the reflow furnace. The distal parts of the positive-electrode terminal 12 and negative-electrode terminal 13 are coupled to the lands via the solder.

Because the entireties of the sealed parts 23a1 to 23a4 of the package 23 are covered in a close contact state with the support 25 having higher rigidity than the film(s) constructing the package 23, deformation of the sealed parts 23a1 to 23a4 due to heat at the time of reflow soldering, and reduction in sealing strength due thereto can be suppressed by the support 25. In addition, a disadvantage such as the one wherein the electrolyte 15 undergoes a vapor pressure rise due to heat and leaks out of the sealed parts 23a1 to 23a4 can be reliably avoided.

Accordingly, an electrical double layer capacitor 10-7 compatible with high-temperature reflow soldering using a lead-free solder can be provided. Demand for an electrical double layer capacitor 10-7 that can be, similarly to a general electronic component, mounted on a substrate or the like by high-temperature reflow soldering using a lead-free solder can be reliably met.

Moreover, the support 25 is formed to continuously cover solely the sealed parts 23a1 to 23a4 of the package 23. Additionally, the support 25 has higher rigidity than the film(s) constructing the package 23. Therefore, handling or the like of the electrical double layer capacitor 10-7 can be readily performed owing to the support 25.

For the support 24, the shape of the support 17-2 shown in FIG. 9(B) and the covering form thereof which have been described last in the section of the second embodiment can be adopted.

Other Embodiments (1) In the first to seventh embodiments, the electrical double layer capacitors 10-1 to 10-7 to which the present invention is applied have been cited. The present invention can be applied to other electrochemical devices having a similar package, for example, a lithium ion capacitor, a redox capacitor, and a lithium ion battery, and the same operation and advantage can be provided.

The invention claimed is:

1. An electrochemical device adapted to be mounted by soldering, wherein the electrochemical device comprises:
a package that is constructed with a film or films and has a sealed portion formed by sealing edge portions of the film(s) superimposed on each other;
an electric storage element that is enclosed in the package; and
a support that has higher rigidity than the film(s) and covers and contacts entirely and liquid-tightly at least the sealed portion of the package including portions from which electrode terminals are led out, wherein the support covers solely the sealed portion of the package.

2. The electrochemical device according to claim 1, wherein the contour of the package is rectangular, and the sealed portion of the package is formed at least on three sides of the rectangular package.

3. The electrochemical device according to claim 1, wherein an interior inside the package enclosing the electric storage element is filled with an electrolyte.

4. The electrochemical device according to claim 1, wherein the film(s) is/are constituted by a laminated film comprising an outer protective layer, a barrier layer, an insulating layer, and an inner sealing layer.

5. The electrochemical device according to claim 1, further comprising a positive-electrode terminal and a negative-electrode terminal led out from the electric storage element and jutting out from the support through the sealed portion of the package.

6. The electrochemical device according to claim 1, wherein the support is made of a material having higher rigidity than a material of the film(s), said material being selected from the group consisting of a ceramic including alumina, a surface-insulated metal including an alloy or cold-rolled aluminum, and a plastic including an epoxy resin, an aramid resin, or a polyimide resin.

* * * * *